United States Patent
Chae et al.

(10) Patent No.: US 11,172,452 B2
(45) Date of Patent: Nov. 9, 2021

(54) METHOD FOR CONTROLLING POWER OF SIDELINK SIGNAL BY RELAY UE IN WIRELESS COMMUNICATION SYSTEM AND APPARATUS THEREFOR

(71) Applicant: LG Electronics Inc., Seoul (KR)

(72) Inventors: Hyukjin Chae, Seoul (KR); Hanbyul Seo, Seoul (KR); Seungmin Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/611,059

(22) PCT Filed: May 8, 2018

(86) PCT No.: PCT/KR2018/005273
§ 371 (c)(1),
(2) Date: Nov. 5, 2019

(87) PCT Pub. No.: WO2018/203738
PCT Pub. Date: Nov. 8, 2018

(65) Prior Publication Data
US 2020/0163028 A1    May 21, 2020

Related U.S. Application Data

(60) Provisional application No. 62/502,608, filed on May 6, 2017, provisional application No. 62/502,598, filed on May 5, 2017.

(51) Int. Cl.
*H04W 52/24* (2009.01)
*H04L 1/18* (2006.01)
(Continued)

(52) U.S. Cl.
CPC .......... *H04W 52/24* (2013.01); *H04L 1/1812* (2013.01); *H04W 24/10* (2013.01); *H04W 52/38* (2013.01)

(58) Field of Classification Search
CPC ..... H04W 52/14; H04W 24/10; H04W 52/38; H04L 1/1812
See application file for complete search history.

(56) References Cited

FOREIGN PATENT DOCUMENTS

| KR | 20160128390 | 11/2016 |
|---|---|---|
| KR | 20160134367 | 11/2016 |

(Continued)

OTHER PUBLICATIONS

PCT International Search Report and Written Opinion in International Application No. PCT/KR2018/005273, dated Sep. 18, 2018, 28 pages (with English translation).

*Primary Examiner* — Yuwen Pan
*Assistant Examiner* — Angelica M Perez
(74) *Attorney, Agent, or Firm* — Fish & Richardson P.C.

(57) ABSTRACT

A method for controlling power of a sidelink signal by a relay UE in a wireless communication system according to various embodiments and an apparatus therefor are provided. Disclosed are a method for controlling power of a sidelink signal by a relay UE and an apparatus therefor, the method comprising the steps of: receiving, from a remote UE transmitting or receiving a side link signal, first measurement information which is measurement information obtained by measuring reception power of the sidelink signal; comparing the first measurement information with second measurement information which is information on the reception power of the sidelink signal having been measured by the relay UE, so as to determine measurement information to be reported to a base station, among the first measurement information and the second measurement information; and receiving, from the base station, power control information configured on the basis of the determined measurement information.

13 Claims, 13 Drawing Sheets

(51) Int. Cl.
*H04W 24/10* (2009.01)
*H04W 52/38* (2009.01)

(56) References Cited

FOREIGN PATENT DOCUMENTS

| KR | 20160135735 | 11/2016 |
|---|---|---|
| WO | WO 2017/026970 A1 * | 2/2017 |
| WO | WO2017017874 | 2/2017 |
| WO | WO2017026970 | 2/2017 |

* cited by examiner

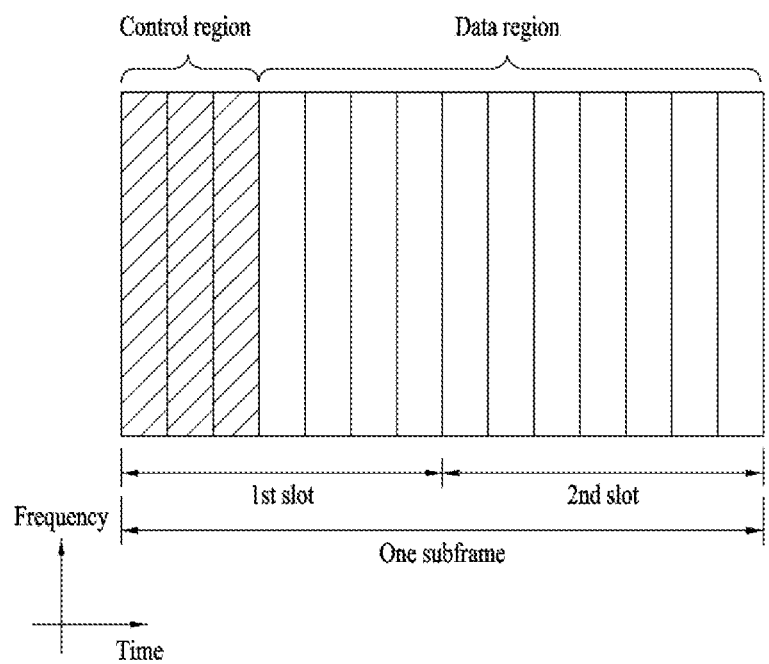
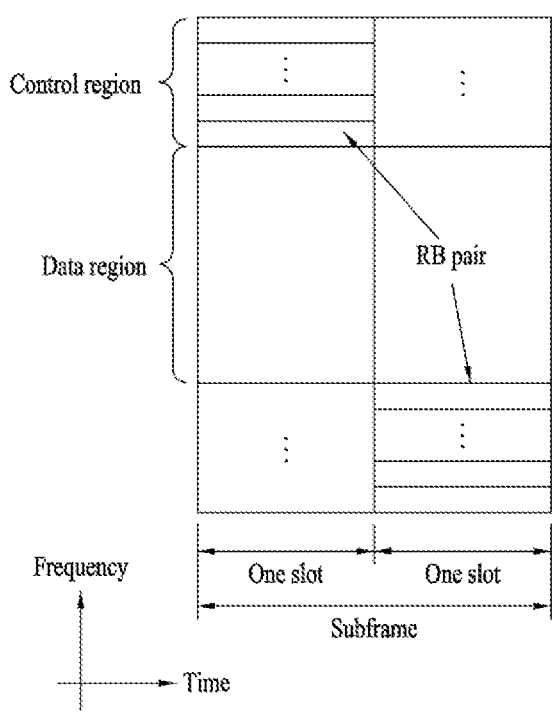

FIG. 5
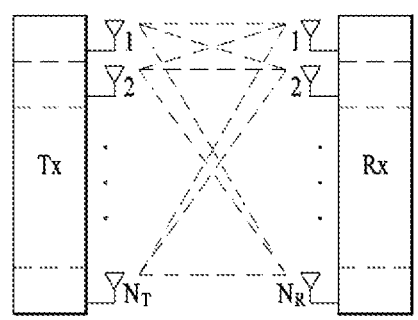
(a)
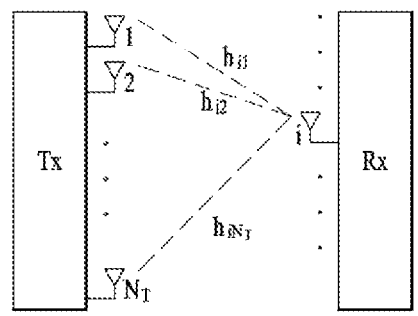
(b)

FIG. 8
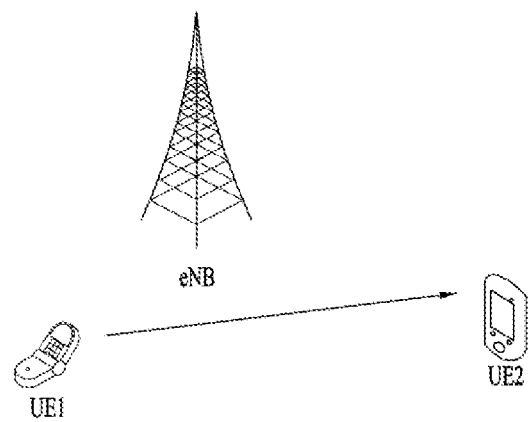
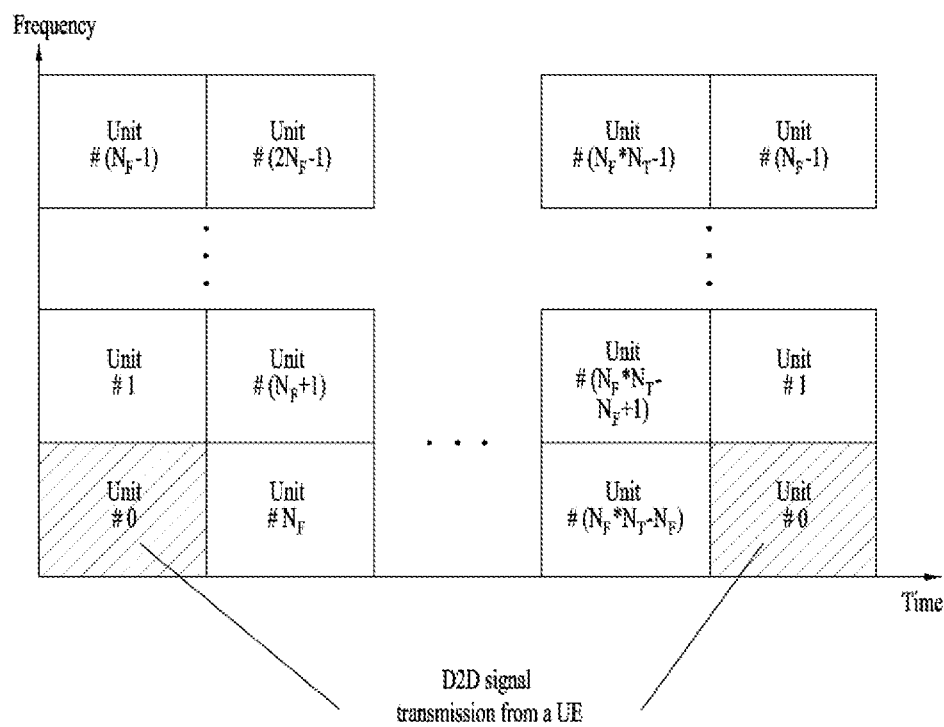

US 11,172,452 B2

METHOD FOR CONTROLLING POWER OF SIDELINK SIGNAL BY RELAY UE IN WIRELESS COMMUNICATION SYSTEM AND APPARATUS THEREFOR

CROSS-REFERENCE TO RELATED APPLICATIONS

This application is a National Stage application under 35 U.S.C. § 371 of International Application No. PCT/KR2018/005273, filed on May 8, 2018, which claims the benefit of U.S. Provisional Application No. 62/502,608, filed on May 6, 2017, and U.S. Provisional Application No. 62/502,598, filed on May 5, 2017. The disclosures of the prior applications are incorporated by reference in their entirety.

TECHNICAL FIELD

The present disclosure relates to a wireless communication system, and more particularly, to a method of controlling power of a sidelink signal by a relay user equipment (UE) and apparatus therefor.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi-carrier frequency division multiple access (MC-FDMA) system.

Device-to-device (D2D) communication is a communication scheme in which a direct link is established between user equipments (UEs) and the UEs exchange voice and data directly without intervention of an evolved Node B (eNB). D2D communication may cover UE-to-UE communication and peer-to-peer communication. In addition, D2D communication may be applied to machine-to-machine (M2M) communication and machine type communication (MTC).

D2D communication is under consideration as a solution to the overhead of an eNB caused by rapidly increasing data traffic. For example, since devices exchange data directly with each other without intervention of an eNB by D2D communication, compared to legacy wireless communication, network overhead may be reduced. Further, it is expected that the introduction of D2D communication will reduce procedures of an eNB, reduce the power consumption of devices participating in D2D communication, increase data transmission rates, increase the accommodation capability of a network, distribute load, and extend cell coverage.

At present, vehicle-to-everything (V2X) communication in conjunction with $D_2D$ communication is under consideration. In concept, V2X communication covers vehicle-to-vehicle (V2V) communication, vehicle-to-pedestrian (V2P) communication for communication between a vehicle and a different kind of terminal, and vehicle-to-infrastructure (V2I) communication for communication between a vehicle and a roadside unit (RSU).

DISCLOSURE

Technical Problem

The object of the present disclosure is to provide a method and apparatus for controlling sidelink transmission power by a relay UE in a wireless communication system. According to the method, the relay UE may control sidelink transmission power by transmitting to a base station the measurement value of received power of a sidelink signal of another UE that does not perform uplink transmission and autonomously determining the value of the sidelink transmission power based thereon, thereby minimizing the complexity and transmission power consumption of the other UE.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, provided is a method of controlling power of a sidelink signal by a relay UE. The method may include receiving first measurement information corresponding to measurement information obtained by measuring received power of the sidelink signal from a remote UE transmitting and receiving the sidelink signal, comparing the first measurement information with second measurement information corresponding to information on the received power of the sidelink signal measured by the relay UE and determining measurement information to report to a base station among the first and second measurement information, and receiving power control information, which is configured based on the determined measurement information, from the base station and determining a power value for controlling sidelink power of the remote UE based on the received power control information.

The power control information may include information on at least one of the range of sidelink transmission power or a configuration parameter for the transmission power.

When the power control information includes the information on the range of the sidelink transmission power, the determined power value may be determined within the range of the sidelink transmission power based on a latency requirement, a proximity service (ProSe) priority per packet (PPPP), and a transmission parameter.

When a difference between a measurement value included in the first measurement information and a measurement value included in the second measurement information is more than or equal to a predetermined threshold, the relay UE may report both the first and second measurement information to the base station.

The first and second measurement information may include a measurement value based on at least one of the following measurement methods: sidelink discovery reference signal received power (SD-RSRP), physical sidelink shared channel reference signal received power (PSSCH RSRP), a sidelink-received signal strength indicator (S-RSSI), physical sidelink control channel reference signal received power (PSCCH RSRP), or a physical sidelink control channel received signal strength indicator (PSCCH RSSI).

The PSCCH RSSI may correspond to received power of a transport block measured in intervals except at least one of an interval used for automatic gain control (AGC) or an interval used for transmission/reception (Tx/Rx) switching.

The PSCCH RSRP may correspond to an average value of received power of a reference signal (RS) for a resource indicated by a PSCCH or a resource related to a predetermined hopping pattern.

The first and second measurement information may include information on received power of the sidelink signal measured during a power holding period indicated by the base station, and wherein the power holding period corresponds to a period in which the relay or remote UE transmits the sidelink signal without changing transmission power.

The power holding period may be configured with at least one of the following units: a sidelink control (SC) period and a period for transmitting a medium access control protocol data unit (MAC PDU).

The method may further include receiving the sidelink signal transmitted by the remote UE with transmission power based on the determined power value. In this case, the sidelink signal may include acknowledgement/negative-acknowledgement (ACK/NACK) for a downlink signal received from the base station.

The method may further include determining a relay resource for transmitting the ACK/NACK by considering information a resource scheduled to the remote UE for the downlink signal and transmitting the ACK/NACK to the base station on the determined relay resource instead of the remote UE.

The remote UE may not transmit an uplink signal to the base station.

In another aspect of the present disclosure, provided is a method of relaying by a relay UE. The method may include receiving a sidelink signal including ACK/NACK for a downlink signal received by a remote UE from a base station, determining a relay resource for transmitting the ACK/NACK by considering information on a resource scheduled to the remote UE for the downlink signal, and transmitting an uplink signal including the ACK/NACK to the base station on the determined relay resource.

The relay resource may be determined by considering a transmission timing of the ACK/NACK and a control channel element (CCE) index which are obtained by decoding downlink control information (DCI) for the remote UE.

The base station may inform the relay UE of a resource of the uplink signal related to the downlink signal while transmitting the downlink signal to the remote UE. Or, according to an embodiment of the present disclosure, the processor is configured to receive a user input to switch the drive mode from an autonomous mode to a manual mode, or to switch from a manual mode to an autonomous mode.

Advantageous Effects

According to the present disclosure, a relay UE can control sidelink transmission power by transmitting to a base station the measurement value of received power of a sidelink signal of another UE that does not perform uplink transmission and autonomously determining the value of the sidelink transmission power based thereon, thereby minimizing the complexity and transmission power consumption of the other UE.

It will be appreciated by persons skilled in the art that the effects that could be achieved with the present disclosure are not limited to what has been particularly described herein above and other advantages of the present disclosure will be more clearly understood from the following detailed description.

DESCRIPTION OF DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings:

The accompanying drawings, which are included to provide a further understanding of the disclosure and are incorporated in and constitute a part of this application, illustrate embodiments of the disclosure and together with the description serve to explain the principle of the disclosure. In the drawings:

Figure 1:
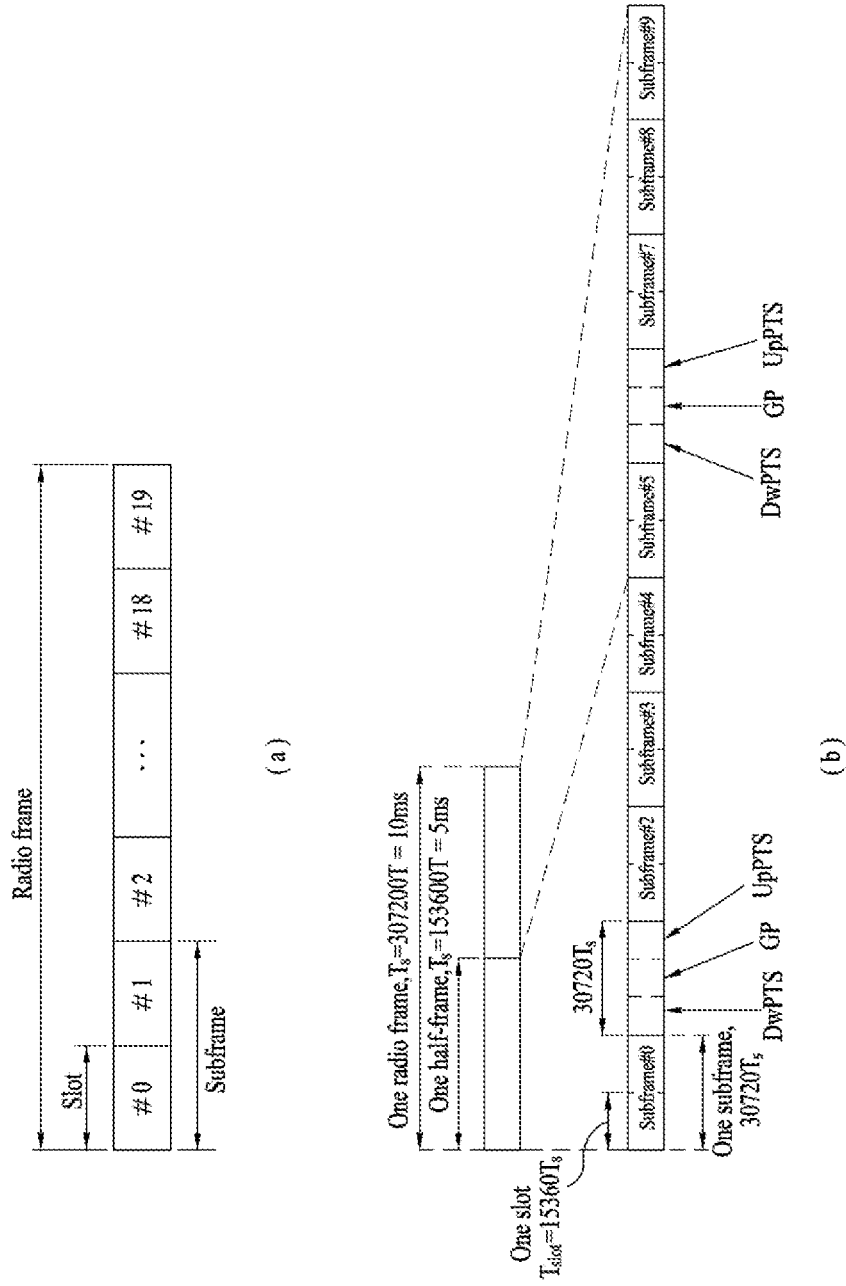
Figure 2:
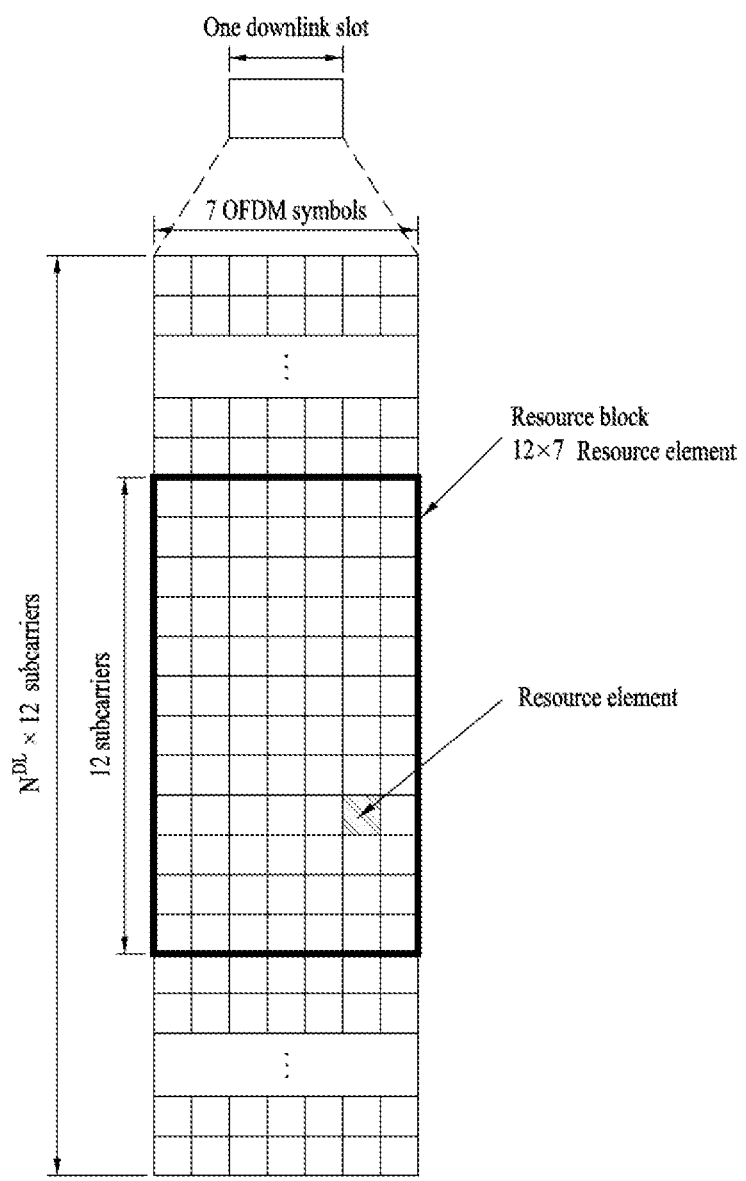
Figure 6:
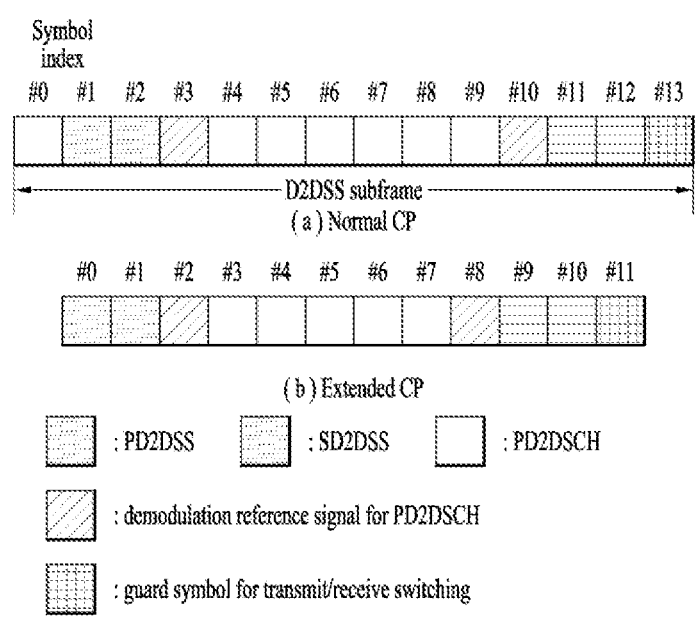
Figure 7:
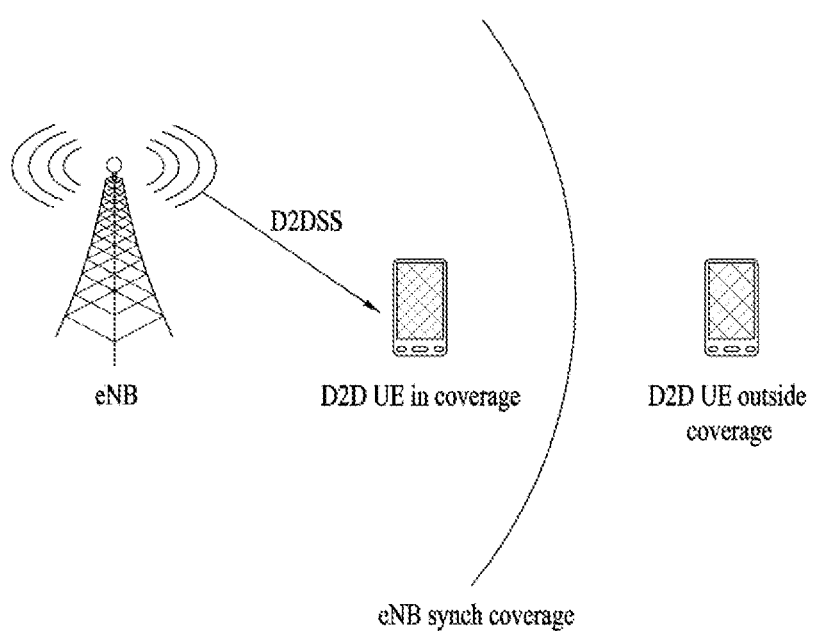
Figure 9:
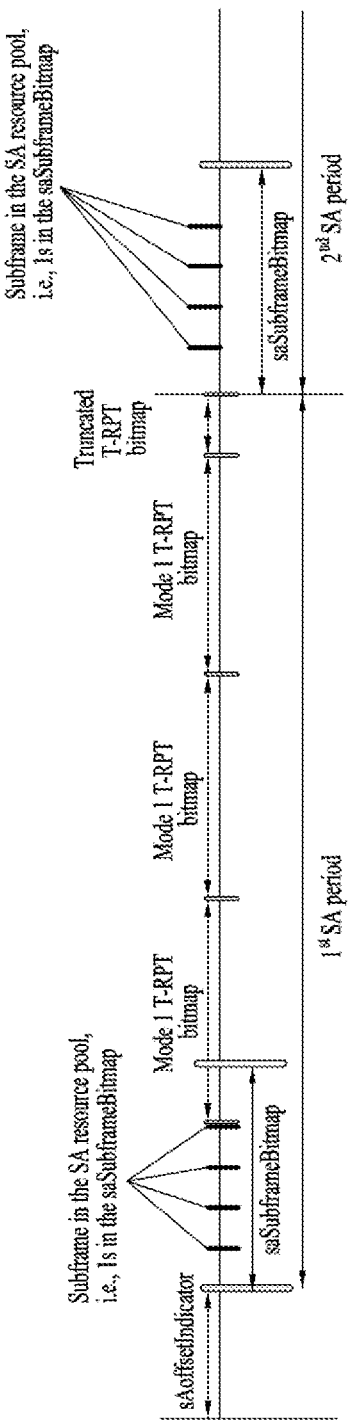
Figure 10:
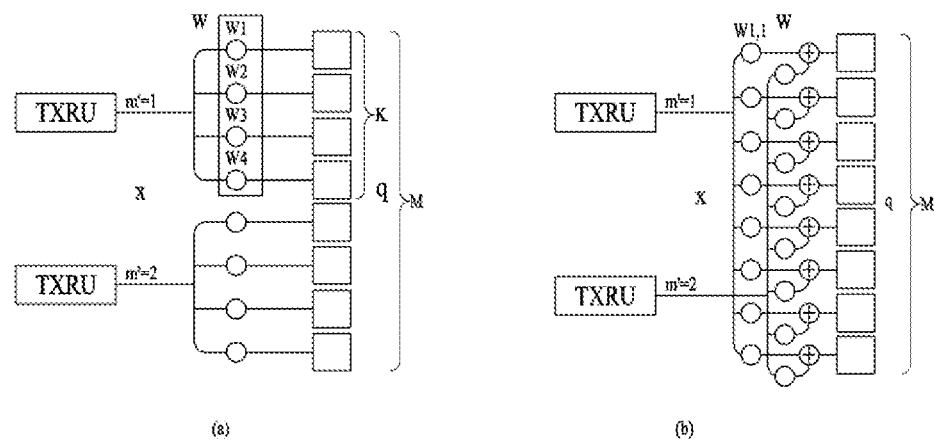
Figure 11:
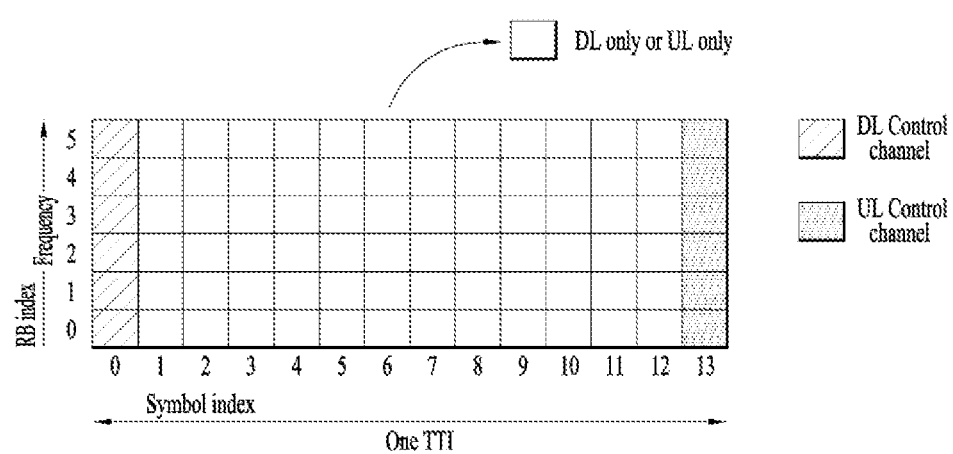
Figure 12:
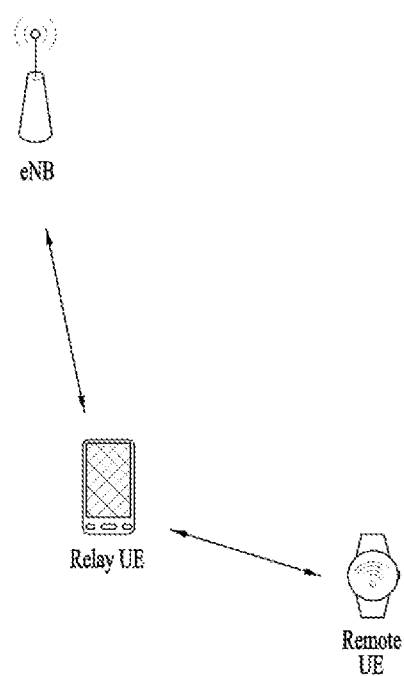
Figure 13:
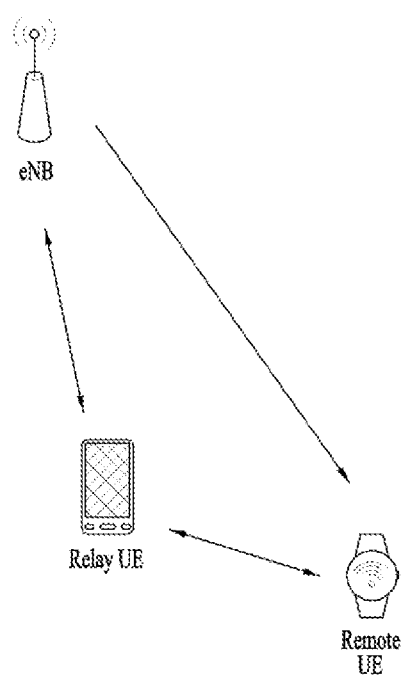
Figure 14:
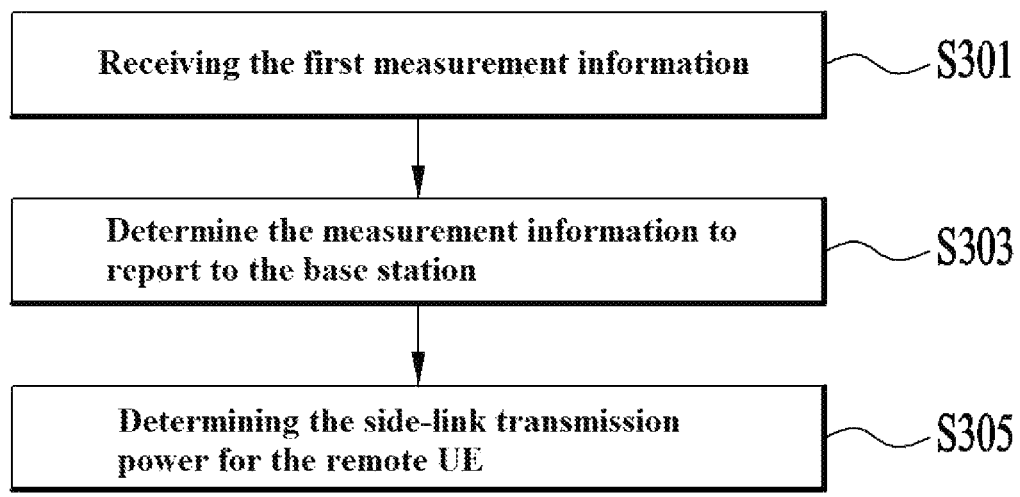
Figure 15:
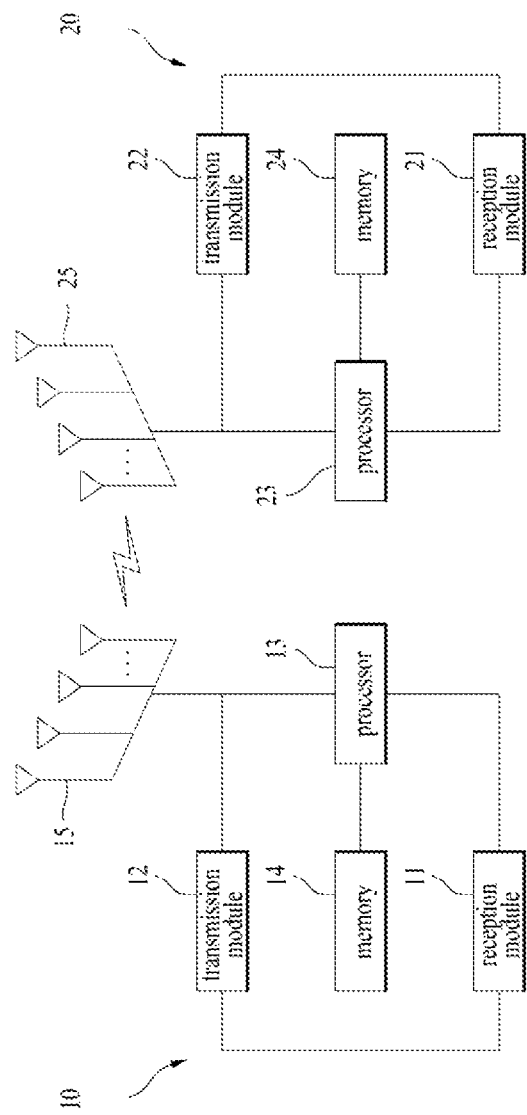

The accompanying drawings, which are included to provide a further understanding of the disclosure and are incorporated in and constitute a part of this application, illustrate embodiments of the disclosure and together with the description serve to explain the principle of the disclosure. In the drawings:

FIG. 1 is a view illustrating the structure of a radio frame;

FIG. 2 is a view illustrating a resource grid during the duration of one downlink slot;

FIG. 3 is a view illustrating the structure of a downlink subframe;

FIG. 4 is a view illustrating the structure of an uplink subframe;

FIG. 5 is a view illustrating the configuration of a wireless communication system having multiple antennas;

FIG. 6 is a view illustrating a subframe carrying a device-to-device (D2D) synchronization signal;

FIG. 7 is a view illustrating relay of a D2D signal;

FIG. 8 is a view illustrating an exemplary D2D resource pool for D2D;

FIG. 9 is a view illustrating a scheduling assignment (SA) period;

FIG. 10 illustrates examples of a connection scheme between TXRUs and antenna elements;

FIG. 11 illustrates an example of a self-contained subframe structure;

FIG. 12 is a diagram schematically illustrating bidirectional relay;

FIG. 13 is a diagram schematically illustrating uplink unidirectional relay;

FIG. 14 is a flowchart for explaining a method by which a relay UE controls sidelink signal power; and FIG. 15 is a diagram schematically illustrating a UE performing D2D communication.

BEST MODE

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or features of any one embodiment may be included in another embodiment and may be replaced with corresponding constructions or features of another embodiment.

In the embodiments of the present disclosure, a description is made, centering on a data transmission and reception relationship between a base station (BS) and a user equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'relay node (RN)' or 'relay station (RS)'. The term 'terminal' may be replaced with the term 'UE', 'mobile station (MS)', 'mobile subscriber station (MSS)', 'subscriber station (SS)', etc.

The term "cell", as used herein, may be applied to transmission and reception points such as a base station (eNB), a sector, a remote radio head (RRH), and a relay, and may also be extensively used by a specific transmission/reception point to distinguish between component carriers.

Specific terms used for the embodiments of the present disclosure are provided to help the understanding of the present disclosure. These specific terms may be replaced with other terms within the scope and spirit of the present disclosure.

In some cases, to prevent the concept of the present disclosure from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present disclosure can be supported by standard documents disclosed for at least one of wireless access systems, Institute of Electrical and Electronics Engineers (IEEE) 802, 3rd Generation Partnership Project (3GPP), 3GPP long term evolution (3GPP LTE), LTE-advanced (LTE-A), or 3GPP2. Steps or parts that are not described to clarify the technical features of the present disclosure can be supported by those documents. Further, all terms as set forth herein can be explained by the standard documents.

Techniques described herein can be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (wireless metropolitan area network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present disclosure are not limited thereto.

LTE/LTE-A Resource Structure/Channel

With reference to FIG. 1, the structure of a radio frame will be described below.

In a cellular orthogonal frequency division multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a transmission time interval (TTI). For example, one subframe may be 1 ms in duration and one slot may be 0.5 ms in duration. A slot includes a plurality of OFDM symbols in the time domain and a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a cyclic prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease inter-symbol interference (ISI).

In the case of the normal CP, one subframe includes 14 OFDM symbols because one slot includes 7 OFDM symbols. The first two or three OFDM symbols of each subframe may be allocated to a physical downlink control channel (PDCCH) and the other OFDM symbols may be allocated to a physical downlink shared channel (PDSCH).

FIG. 1(b) illustrates the type-2 radio frame structure. A type-2 radio frame includes two half frames, each having 5 subframes, a downlink pilot time slot (DwPTS), a guard period (GP), and an uplink pilot time slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present disclosure. For example, a downlink slot may include 7 OFDM symbols in the case of the normal CP, whereas a downlink slot may include 6 OFDM symbols in the case of the extended CP. Each element of the resource grid is referred to as a resource element (RE). An RB includes 12×7 REs. The number of RBs in a downlink slot, NDL depends on a downlink transmission bandwidth. An uplink slot may have the same structure as a downlink slot.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a physical control format indicator channel (PCFICH), a physical downlink control channel (PDCCH), and a physical hybrid automatic repeat request (HARQ) indicator channel (PHICH). The PCFICH is located in the first OFDM symbol of a subframe, carrying information about the number of OFDM symbols used for transmission of control channels in the subframe. The PHICH delivers an HARQ acknowledgment/negative acknowledgment (ACK/NACK) signal in response to an uplink transmission. Control information carried on the PDCCH is called downlink control information (DCI). The DCI transports uplink or downlink scheduling information, or uplink transmission power control commands for UE groups. The PDCCH delivers information about resource allocation and a transport format for a downlink shared channel (DL-SCH), resource allocation information about an uplink shared channel (UL-SCH), paging information of a paging channel (PCH), system information on the DL-SCH, information about resource allocation for a higher-layer control message such as a Random Access Response transmitted on the PDSCH, a set of transmission power control commands for individual UEs of a UE group, transmission power control information, voice over Internet protocol (VoIP) activation information, etc. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a cyclic redundancy check (CRC) to control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging indicator Identifier (P-RNTI). If the PDCCH carries system information, particularly, a system information block (SIB), its CRC may be masked by a system information ID and a system information RNTI (SI-RNTI). To indicate that the PDCCH carries a random access response in response to a random access preamble transmitted by a UE, its CRC may be masked by a random access-RNTI (RA-RNTI).

FIG. 4 illustrates the structure of an uplink subframe. An uplink subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signal (RS)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between transmission (Tx) antennas and reception (Rx) antennas is required for successful signal reception. Accordingly, an RS should be transmitted through each Tx antenna.

RSs may be divided into downlink RSs and uplink RSs. In the current LTE system, the uplink RSs include:

i) Demodulation-reference signal (DM-RS) used for channel estimation for coherent demodulation of information delivered on a PUSCH and a PUCCH; and ii) Sounding reference signal (SRS) used for an eNB or a network to measure the quality of an uplink channel in a different frequency.

The downlink RSs are categorized into:

i) Cell-specific reference signal (CRS) shared among all UEs of a cell;

ii) UE-specific RS dedicated to a specific UE;

iii) DM-RS used for coherent demodulation of a PDSCH, when the PDSCH is transmitted;

iv) Channel state information-reference signal (CSI-RS) carrying CSI, when downlink DM-RSs are transmitted;

v) Multimedia broadcast single frequency network (MBSFN) RS used for coherent demodulation of a signal transmitted in MBSFN mode; and vi) Positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

Modeling of MIMO System

FIG. 5 is a diagram illustrating a configuration of a wireless communication system having multiple antennas.

As shown in FIG. 5(a), if the number of Tx antennas is increased to $N_T$ and the number of Rx antennas is increased to $N_R$, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R) \quad \text{[Equation 1]}$$

For instance, in an MIMO communication system, which uses four Tx antennas and four Rx antennas, a transmission rate four times higher than that of a single antenna system can be obtained. Since this theoretical capacity increase of the MIMO system has been proved in the middle of 1990s, many ongoing efforts are made to various techniques to substantially improve a data transmission rate. In addition, these techniques are already adopted in part as standards for various wireless communications such as 3G mobile communication, next generation wireless LAN, and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. It is assumed that there are $N_T$ Tx antennas and $N_R$ Rx antennas.

Regarding a transmitted signal, if there are $N_T$ Tx antennas, the maximum number of pieces of information that can be transmitted is $N_T$. Hence, the transmission information can be represented as shown in Equation 2.

$$s = [s_1, s_2, \ldots, s_{N_T}]^T \quad \text{[Equation 2]}$$

Meanwhile, transmit powers can be set different from each other for individual pieces of transmission information $s_1, s_2, \ldots, s_{N_T}$, respectively. If the transmit powers are set to $P_1, P_2, \ldots, P_{N_T}$, respectively, the transmission information with adjusted transmit powers can be represented as Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

In addition, $\hat{s}$ can be represented as Equation 4 using diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Assuming a case of configuring $N_T$ transmitted signals $x_1, x_2, \ldots, x_{N_T}$ which are actually transmitted, by applying weight matrix W to the information vector $\hat{S}$ having the adjusted transmit powers, the weight matrix W serves to appropriately distribute the transmission information to each antenna according to a transport channel state. $x_1, x_2, \ldots, x_{N_T}$ can be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{21} & w_{22} & \ldots & w_{2N_T} \\ \vdots & & \ddots & \\ w_{i1} & w_{i2} & \ldots & w_{iN_T} \\ \vdots & & \ddots & \\ w_{N_T 1} & w_{N_T 2} & \ldots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \quad \text{[Equation 5]}$$

$$W\hat{s} = WPs$$

In Equation 5, $w_{ij}$ denotes a weight between an $i^{th}$ Tx antenna and $j^{th}$ information. W is also called a precoding matrix.

If the $N_R$ Rx antennas are present, respective received signals $y_1, y_2, \ldots, y_{N_T}$ of the antennas can be expressed as follows.

$$y = [y_1, y_2, \ldots, y_{N_R}]^T \quad \text{[Equation 6]}$$

If channels are modeled in the MIMO wireless communication system, the channels may be distinguished according to Tx/Rx antenna indexes. A channel from the Tx antenna j to the Rx antenna i is denoted by $h_{ij}$. In $h_{ij}$, it is noted that the indexes of the Rx antennas precede the indexes of the Tx antennas in view of the order of indexes.

FIG. 5(b) is a diagram illustrating channels from the $N_T$ Tx antennas to the Rx antenna i. The channels may be combined and expressed in the form of a vector and a matrix. In FIG. 5(b), the channels from the $N_T$ Tx antennas to the Rx antenna i can be expressed as follows.

$$h_i^T = [h_{i1}, h_{i2}, \ldots, h_{iN_T}] \quad \text{[Equation 7]}$$

Accordingly, all channels from the $N_T$ Tx antennas to the $N_R$ Rx antennas can be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \quad \text{[Equation 8]}$$

An AWGN (Additive White Gaussian Noise) is added to the actual channels after a channel matrix H. The AWGN $n_1, n_2, \ldots, n_{N_R}$ respectively added to the $N_R$ Rx antennas can be expressed as follows.

$$n = [n_1, n_2, \ldots, n_{N_R}]^T \quad \text{[Equation 9]}$$

Through the above-described mathematical modeling, the received signals can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Equation 10]}$$

$$Hx + n$$

Meanwhile, the number of rows and columns of the channel matrix H indicating the channel state is determined by the number of Tx and Rx antennas. The number of rows of the channel matrix H is equal to the number $N_R$ of Rx antennas and the number of columns thereof is equal to the number $N_T$ of Tx antennas. That is, the channel matrix H is an $N_R \times N_T$ matrix.

The rank of the matrix is defined by the smaller of the number of rows and the number of columns, which are independent from each other. Accordingly, the rank of the matrix is not greater than the number of rows or columns. The rank rank(H) of the channel matrix H is restricted as follows.

$$\text{rank}(H) \leq \min(N_T, N_R) \qquad \text{[Equation 11]}$$

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

In the description of the present document, 'rank' for MIMO transmission indicates the number of paths capable of sending signals independently on specific time and frequency resources and 'number of layers' indicates the number of signal streams transmitted through the respective paths. Generally, since a transmitting end transmits the number of layers corresponding to the rank number, one rank has the same meaning of the layer number unless mentioned specially.

Synchronization Acquisition of D2D UE

Now, a description will be given of synchronization acquisition between UEs in D2D communication based on the foregoing description in the context of the legacy LTE/LTE-A system. In an OFDM system, if time/frequency synchronization is not acquired, the resulting inter-cell interference (ICI) may make it impossible to multiplex different UEs in an OFDM signal. If each individual D2D UE acquires synchronization by transmitting and receiving a synchronization signal directly, this is inefficient. In a distributed node system such as a D2D communication system, therefore, a specific node may transmit a representative synchronization signal and the other UEs may acquire synchronization using the representative synchronization signal. In other words, some nodes (which may be an eNB, a UE, and a synchronization reference node (SRN, also referred to as a synchronization source)) may transmit a D2D synchronization signal (D2DSS) and the remaining UEs may transmit and receive signals in synchronization with the D2DSS.

D2DSSs may include a primary D2DSS (PD2DSS) or a primary sidelink synchronization signal (PSSS) and a secondary D2DSS (SD2DSS) or a secondary sidelink synchronization signal (SSSS). The PD2DSS may be configured to have a similar/modified/repeated structure of a Zadoff-chu sequence of a predetermined length or a primary synchronization signal (PSS). Unlike a DL PSS, the PD2DSS may use a different Zadoff-chu root index (e.g., 26, 37). And, the SD2DSS may be configured to have a similar/modified/repeated structure of an M-sequence or a secondary synchronization signal (SSS). If UEs synchronize their timing with an eNB, the eNB serves as an SRN and the D2DSS is a PSS/SSS. Unlike PSS/SSS of DL, the PD2DSS/SD2DSS follows UL subcarrier mapping scheme. FIG. 6 shows a subframe in which a D2D synchronization signal is transmitted. A physical D2D synchronization channel (PD2DSCH) may be a (broadcast) channel carrying basic (system) information that a UE should first obtain before D2D signal transmission and reception (e.g., D2DSS-related information, a duplex mode (DM), a TDD UL/DL configuration, a resource pool-related information, the type of an application related to the D2DSS, etc.). The PD2DSCH may be transmitted in the same subframe as the D2DSS or in a subframe subsequent to the frame carrying the D2DSS. A DMRS can be used to demodulate the PD2DSCH.

The SRN may be a node that transmits a D2DSS and a PD2DSCH. The D2DSS may be a specific sequence and the PD2DSCH may be a sequence representing specific information or a codeword produced by predetermined channel coding. The SRN may be an eNB or a specific D2D UE. In the case of partial network coverage or out of network coverage, the SRN may be a UE.

In a situation illustrated in FIG. 7, a D2DSS may be relayed for D2D communication with an out-of-coverage UE. The D2DSS may be relayed over multiple hops. The following description is given with the appreciation that relay of an SS covers transmission of a D2DSS in a separate format according to a SS reception time as well as direct amplify-and-forward (AF)-relay of an SS transmitted by an eNB. As the D2DSS is relayed, an in-coverage UE may communicate directly with an out-of-coverage UE.

D2D Resource Pool

FIG. 8 shows an example of a first UE (UE1), a second UE (UE2) and a resource pool used by UE1 and UE2 performing D2D communication. In FIG. 8(a), a UE corresponds to a terminal or such a network device as an eNB transmitting and receiving a signal according to a D2D communication scheme. A UE selects a resource unit corresponding to a specific resource from a resource pool corresponding to a set of resources and the UE transmits a D2D signal using the selected resource unit. UE2 corresponding to a receiving UE receives a configuration of a resource pool in which UE1 is able to transmit a signal and detects a signal of UE1 in the resource pool. In this case, if UE1 is located at the inside of coverage of an eNB, the eNB can inform UE1 of the resource pool. If UE1 is located at the outside of coverage of the eNB, the resource pool can be informed by a different UE or can be determined by a predetermined resource. In general, a resource pool includes a plurality of resource units. A UE selects one or more resource units from among a plurality of the resource units and may be able to use the selected resource unit(s) for D2D signal transmission. FIG. 8(b) shows an example of configuring a resource unit. Referring to FIG. 8(b), the entire frequency resources are divided into the $N_F$ number of resource units and the entire time resources are divided into the NT number of resource units. In particular, it is able to define $N_F*N_T$ number of resource units in total. In particular, a resource pool can be repeated with a period of $N_T$ subframes. Specifically, as shown in FIG. 8, one resource unit may periodically and repeatedly appear. Or, an index of a physical resource unit to which a logical resource unit is mapped may change with a predetermined pattern according to time to obtain a diversity gain in time domain and/or frequency domain. In this resource unit structure, a resource pool may correspond to a set of resource units capable of being used by a UE intending to transmit a D2D signal.

A resource pool can be classified into various types. First of all, the resource pool can be classified according to contents of a D2D signal transmitted via each resource pool. For example, the contents of the D2D signal can be classified into various signals and a separate resource pool can be configured according to each of the contents. The contents of the D2D signal may include a scheduling assignment (SA or physical sidelink control channel (PSCCH)), a D2D data channel, and a discovery channel. The SA may correspond to a signal including information on a resource position of a D2D data channel, information on a modulation and coding scheme (MCS) necessary for modulating and demodulating a data channel, information on a MIMO transmission scheme, information on a timing advance (TA), and the like. The SA signal can be transmitted on an identical resource unit in a manner of being multiplexed with D2D data. In this case, an SA resource pool may correspond to a pool of resources that an SA and D2D data are transmitted in a manner of being multiplexed. The SA signal can also be referred to as a D2D control channel or a physical sidelink control channel (PSCCH). The D2D data channel (or, physical sidelink shared channel (PSSCH)) corresponds to a resource pool used by a transmitting UE to transmit user data. If an SA and a D2D data are transmitted in a manner of being multiplexed in an identical resource unit, D2D data channel except SA information can be transmitted only in a resource pool for the D2D data channel. In other word, REs, which are used to transmit SA information in a specific resource unit of an SA resource pool, can also be used for transmitting D2D data in a D2D data channel resource pool. The discovery channel may correspond to a resource pool for a message that enables a neighboring UE to discover transmitting UE transmitting information such as ID of the UE, and the like.

Although contents of D2D signal are identical to each other, it may use a different resource pool according to a transmission/reception attribute of the D2D signal. For example, in case of the same D2D data channel or the same discovery message, the D2D data channel or the discovery signal can be classified into a different resource pool according to a transmission timing determination scheme (e.g., whether a D2D signal is transmitted at the time of receiving a synchronization reference signal or the timing to which a prescribed timing advance is added) of a D2D signal, a resource allocation scheme (e.g., whether a transmission resource of an individual signal is designated by an eNB or an individual transmitting UE selects an individual signal transmission resource from a pool), a signal format (e.g., number of symbols occupied by a D2D signal in a subframe, number of subframes used for transmitting a D2D signal), signal strength from an eNB, strength of transmit power of a D2D UE, and the like. For clarity, a method for an eNB to directly designate a transmission resource of a D2D transmitting UE is referred to as a mode 1 (mode 3 in case of V2X). If a transmission resource region is configured in advance or an eNB designates the transmission resource region and a UE directly selects a transmission resource from the transmission resource region, it is referred to as a mode 2 (mode 4 in case of V2X). In case of performing D2D discovery, if an eNB directly indicates a resource, it is referred to as a type 2. If a UE directly selects a transmission resource from a predetermined resource region or a resource region indicated by the eNB, it is referred to as type 1.

SA Transmission/Reception

A mode-1 UE may transmit an SA (D2D control signal, or sidelink control information (SCI)) in resources configured by an eNB. For a mode-2 UE, the eNB configures resources for D2D transmission. The mode-2 UE may select time-frequency resources from the configured resources and transmit an SA in the selected time-frequency resources.

An SA period may be defined as illustrated in FIG. 9. Referring to FIG. 9, a first SA period may start in a subframe spaced from a specific system frame by a predetermined offset, SAOffsetIndicator indicated by higher-layer signaling. Each SA period may include an SA resource pool and a subframe pool for D2D data transmission. The SA resource pool may include the first subframe of the SA period to the last of subframes indicated as carrying an SA in a subframe bitmap, saSubframeBitmap. The resource pool for D2D data transmission may include subframes used for actual data transmission through application of a time-resource pattern for transmission (T-RPT) or a time-resource pattern (TRP) in mode 1. As illustrated, if the number of subframes included in an SA period except for an SA resource pool is larger than the number of T-RPT bits, the T-RPT may be applied repeatedly, and the last applied T-RPT may be truncated to be as long as the number of remaining subframes. A transmitting UE performs transmission at positions corresponding to 1 s set in a T-RPT bitmap in an indicated T-RPT, and transmits one medium access control layer protocol data unit (MAC PDU) four times.

In V2V communication, a cooperative awareness message (CAM) of a periodic message type, a decentralized environmental notification message (DENM) of an event triggered message type, and so on may be transmitted. The CAM may deliver basic vehicle information including dynamic state information about a vehicle, such as a direction and a speed, static data of the vehicle, such as dimensions, an ambient illumination state, details of a path, and so on. The CAM may be 50 bytes to 300 bytes in length. The CAM is broadcast, and its latency should be shorter than 100 ms. The DENM may be generated, upon occurrence of an unexpected incident such as breakdown or an accident of a vehicle. The DENM may be shorter than 3000 bytes, and received by all vehicles within a transmission range. The DENM may have a higher priority than the CAM. When it is said that a message has a higher priority, this may mean that from the perspective of one UE, in the case of simultaneous transmission of messages, the higher-priority message is transmitted above all things, or earlier in time than any other of the plurality of messages. From the perspective of multiple UEs, a message having a higher priority may be subjected to less interference than a message having a lower priority, to thereby have a reduced reception error probability. Regarding the CAM, the CAM may have a larger message size when it includes security overhead than when it does not.

FIG. 10 illustrates examples of a connection scheme between TXRUs and antenna elements.

FIG. 10 (a) illustrates that TXRU is connected to a sub-array. In this case, the antenna elements are connected to only one TXRU. Unlike FIG. 10 (a), FIG. 10 (b) illustrates that TXRU is connected to all antenna elements. In this case, the antenna elements are connected to all TXRUs. In FIG. 10, W indicates a phase vector multiplied by an analog phase shifter. That is, a direction of analog beamforming is determined by W. In this case, mapping between CSI-RS antenna ports and TXRUs may be 1-to-1 or 1-to-many.

As more communication devices require greater communication capacity, the need of mobile broadband communication more advanced than the conventional RAT (radio access technology) has been issued. Also, massive MTC (Machine Type Communications) technology that provides various services anywhere and at any time by connecting a plurality of devices and things is one of main issues which will be considered in next generation communication. Furthermore, a communication system design considering service/UE susceptible to reliability and latency has been discussed. Considering this status, the introduction of the next generation RAT has been discussed, and the next generation RAT will be referred to as new RAT in the present disclosure.

A self-contained subframe structure shown in FIG. 11 is considered in the fifth generation new RAT to minimize data transmission latency in a TDD system. FIG. 11 illustrates an example of a self-contained subframe structure.

In FIG. 11, oblique line areas indicate downlink control regions and black colored areas indicate uplink control regions. Areas having no mark may be used for downlink data transmission or uplink data transmission. In this structure, downlink transmission and uplink transmission are performed in due order within one subframe, whereby downlink data may be transmitted and uplink ACK/NACK may be received within the subframe. As a result, the time required for data re-transmission may be reduced when an error occurs in data transmission, whereby latency of final data transfer may be minimized.

In this self-contained subframe structure, a time gap for switching from a transmission mode to a reception mode or vice versa is required for the eNB and the UE. To this end, some OFDM symbols (OS) at the time when a downlink is switched to an uplink in the self-contained subframe structure are set to a guard period.

Examples of the self-contained subframe type that may be configured in the system operating based on the new RAT may consider four subframe types as follows.

downlink control period+downlink data period+GP+uplink control period downlink control period+downlink data period downlink control period+GP+uplink data period+uplink control period downlink control period+GP+uplink data period In 5G new RAT, a signal transmissions scheme may differ according to services or requirements. For example, a transmission time unit of enhanced mobile broadband (eMBB) may be relatively long and a transmission time unit of ultra-reliable and low latency communication (URLLC) may be relatively short.

According to a service type, particularly, in the case of an urgent service, a URLLC signal may be transmitted on a corresponding resource even in the middle of eMBB transmission. Accordingly, in terms of a network or a UE, URLLC transmission may consider preemption of a partial transmission resource of eMBB.

In this case, a part of a transmission resource of eMBB having a relatively long transmission time unit may be punctured due to the preemption and an eMBB signal may be modified because the eMBB signal is superimposed on another signal such as the URLLC signal.

When URLLC transmission preempts a partial resource of eMBB transmission, there is a high possibility that the UE fails to decode a specific code block (CB) of eMBB transmission. Particularly, this situation may cause decoding failure for a specific CB even when a channel state is good. Therefore, 5G new RAT may consider performing retransmission in a CB unit, rather than in a transport block (TB) unit.

Beamforming in mmW

In a millimeter wave (mmW) system, since a wavelength is shortened, a plurality of antenna elements can be installed in the same area. That is, considering that the wavelength in the 30 GHz band is 1 cm, a total of 64 (8×8) antenna elements may be installed in a 4 by 4 cm panel at intervals of 0.5 lambda (wavelength) in the case of a 2-dimensional array. Therefore, in the mmW system, it is attempted to improve coverage or throughput by increasing beamforming (BF) gain using multiple antenna elements.

If each antenna element is equipped with a transceiver unit (TXRU) to enable adjustment of transmission power and phases per antenna element, independent BF may be performed on each frequency resource. However, installing TXRUs in all about 100 antenna elements is less feasible in terms of cost. Therefore, a method of mapping a plurality of antenna elements to one TXRU and adjusting the direction of a beam using an analog phase shifter has been considered. However, such an analog BF method is disadvantageous in that frequency selective BF is impossible because only one beam direction is generated over the whole band.

As an intermediate form of digital BF and analog BF, hybrid BF with B TXRUs fewer than Q antenna elements may be considered. In the case of the hybrid BF, the number of beam directions that can be transmitted at the same time is limited to B or less although it depends on how the B TXRUs and the Q antenna elements are connected.

Channel-Dependent Cyclic Delay Diversity

Cyclic delay diversity (CDD) is a technique in which a symbol transmitted on each antenna in a multi-antenna system is delayed for a predetermined time period and then transmitted (the amount of delay may vary for each antenna). The delay may have the effect that a beam is cycled for each frequency resource in the frequency domain due to linear phase rotation.

For example, if transmission on the first antenna is performed with no delay and transmission on the second antenna is delayed for a predetermined delay value (e.g., theta), i-th Power Control for UE-to-Network Relay:

FIG. 12 is a diagram schematically illustrating bidirectional relay. The bidirectional relay means that a remote UE performs reception through a relay in both uplink and downlink. The remote UE means a UE that performs transmission and reception through a relay UE, instead of directly transmitting and receiving an uplink/downlink signal to and from an eNB. FIG. 13 is a diagram schematically illustrating uplink unidirectional relay. In UE-to-Network relay, unidirectional relay means that either uplink (UL) or downlink (DL) is connected to an eNB and the other link is connected to a relay for data transmission. As an embodiment of the unidirectional relay, a UE may directly receive a signal from the eNB in DL, but in the case of UL transmission, the UE may transmit a signal with low transmission power to the relay to reduce power consumption.

The present disclosure proposes a method of efficiently controlling transmission power when a relay UE relays data of another UE (remote UE) to an eNB. As shown in FIGS. 12 and 13, the relay UE may relay a signal for the remote UE, which is received from the eNB, or relay a signal from the remote UE to the eNB. The bidirectional relaying means that when relaying a signal of another UE, a UE relays the signal in both UL and DL. The unidirectional relaying means that either DL or UL is used for relaying. FIG. 13 illustrates UL unidirectional relaying. In general, when the remote UE transmits a UL signal through the relay UE, the remote UE may consume low power compared to when the remote UE directly transmits the UL signal to the eNB. This is because a distance between the remote UE and the relay UE is expected to be shorter than that between the remote UE and the eNB. Thus, the remote UE may transmit the UL signal to the eNB through the relay UE in terms of efficient use of transmission power. Hereinafter, a method of performing efficient power control method will be described for each of the unidirectional relay and bidirectional relay.

According to an embodiment, the relay UE may report at least one of sidelink transmission power information or sidelink measurement information to the eNB to determine sidelink power control and/or a transmission parameter (range). The eNB may determine at least one of the transmission power of the relay or remote UE or the transmission parameter based on the report and then indicate (or transmit) the transmission power and transmission parameter to the relay or remote UE. The eNB may transmit the information to the relay or remote UE through physical layer signaling or higher layer signaling. The remote UE may report the at least one of the sidelink transmission power information or the sidelink measurement information to the relay UE to determine the sidelink power control and/or transmission parameter (range). In addition, when reporting the sidelink power information and/or sidelink measurement information to the eNB, the relay UE may separately report its measurement information and feedback information from the remote UE. Alternatively, the relay UE may feed back or report an average/maximum/minimum value. When the sidelink measurement information or sidelink power information of the relay UE is significantly different from that of the remote UE, if the relay UE provides extra information, the eNB may perform the power control more efficiently. If the two pieces of measurement information (the measurement information of the relay UE and the measurement information of the remote UE) is similar to each other, the relay UE may feed back/report an average, maximum, minimum, or single value to the eNB.

The relay UE may feed back the sidelink transmission power information and sidelink measurement information to the eNB by including some or all of the following multiple measurement results therein.

The multiple measurement results, which are fed back to the eNB, may include measurement values based on at least one of sidelink discovery reference signal received power (SD-RSRP), physical sidelink shared channel reference signal received power (PSSCH RSRP), a sidelink-received signal strength indicator (S-RSSI), physical sidelink control channel reference signal received power (PSCCH RSRP), or a physical sidelink control channel received signal strength indicator (PSCCH RSSI).

The SD-RSRP may correspond to a measurement value obtained by measuring the received power of a reference signal (RS) for a discovery signal. Since the SD-RSRP is expected to be transmitted with fixed power, the SD-RSRP is advantageous in that stable measurement is possible without additional information compared to other measurements. The PSSCH RSRP may be obtained by measuring the received power of an RS in an RB for data transmission. The S-RSSI may be defined as the average of received power measured in a specific RB or RB group. The S-RSSI may be measured except an interval used for automatic gain control (AGC) or an interval used for Tx/Rx switching.

The PSCCH RSRP may be obtained by measuring the received power of an RS in an RB for control signal transmission. In this case, since a PSCCH uses the same RS, averaging of multiple PSCCHs may be limited to the PSCCH RSRP for resources indicated by the content in the PSCCH or resources related to a predetermined hopping pattern. For example, assuming that each UE performs PSCCH transmission twice and a PSCCH indicates the location of a resource for transmitting the next PSCCH implicitly or explicitly, only the PSCCH RSRP on the corresponding resource may be averaged. That is, by measuring the PSCCH RSRP transmitted from the same UE, the accuracy of the PSCCH RSRP may be improved.

The PSCCH RSSI may be defined as the average of received power in an RB for control signal transmission. In this case, an interval used for AGC or an interval used for Tx/Rx switching may be excluded.

In the case of the unidirectional relay, information on multiple measurement results may be signaled to the relay UE through physical layer signaling or higher layer signaling. The relay UE may signal to the eNB at least one of a sidelink measurement result measured by the relay UE or a sidelink measurement result measured and fed back by the remote UE. Specifically, when the measurement result of the relay UE is significantly different from that of the remote UE (i.e., when a difference therebetween is more than or equal to a predetermined value), the relay UE may feed back to the eNB both the measurement result measured by the relay UE and the measurement result measured by the remote UE.

Alternatively, when the difference between the sidelink measurement of the relay UE and the sidelink measurement of the remote UE is less than the predetermined threshold, the relay UE may feed back only one of the two sidelink measurements to the eNB.

According to an embodiment, the eNB may determine at least one of a sidelink transmission power range, a power configuration parameter range, or a specific transmission power value based on the sidelink measurement information fed back by the relay UE and then inform the relay or remote UE of the determination. In the case of the bidirectional relay, the relay UE may signal to the remote UE information on at least one of a transmission power parameter for the remote UE, a parameter range, a transmission power value, or a transmission power value range through physical layer signaling or higher layer signaling.

The eNB may directly indicate the transmission power or the transmission power range. In this case, the upper limit may be limited by UL power control. The reason why the upper limit is limited by the UL power control is to reduce potential interference to cellular systems. When the eNB signals to the relay UE the transmission power range of the remote UE, the relay UE may determine a prescribed value within the transmission power range signaled from the eNB and then inform the remote UE of the prescribed value. That is, the transmission power may be determined by the relay UE rather than the remote UE, and thus, the complexity of the remote UE may be reduced.

When the eNB signals the transmission power range, the relay UE may determine the transmission power based on a latency requirement, a proximity service (ProSe) priority per packet (PPPP), and a transmission parameter (e.g., MCS, retransmission number, decoding status, etc.). For example, when remote UE feeds back failure in decoding, the relay UE may perform transmission with power higher than that used for previous transmission. In this case, an increment in the power may be predetermined or signaled by the eNB through physical layer signaling or higher layer signaling.

Meanwhile, the sidelink transmission power may be configured based on the sidelink measurement. To this end, a receiving UE (remote or relay UE) should be able to perform the measurement stably to configure the transmission power correctly. For example, if the transmission power varies while the receiving UE performs the measurement, the receiving UE may not perform the measurement correctly, and as a result, the transmission power may not be configured properly.

To solve this problem, a transmitting UE that transmits a sidelink signal may maintain transmission power during a predetermined time period. To this end, the eNB may signal information on a period during which the sidelink transmission power is maintained to either or both of the remote UE and the relay UE through physical layer signaling or higher layer signaling. When the eNB signals such information to the relay UE, the relay UE may provide some or all of the information to the remote UE through physical layer signaling or higher layer signaling. When sidelink mode 1/2 is used for relaying, it may be regulated that the transmission power is fixed during a single or multiple sidelink control (SC) periods. The transmission power may be maintained while a single or multiple medium access control protocol data units (MAC PDUs) are transmitted.

HARQ ACK Transmission Method for Unidirectional Relay

In the case of the unidirectional relay, when a UE receives a signal from an eNB, the UE may not feed back HARQ ACK or channel state information (CSI) to the eNB. Instead, a relay may transmit such feedback to the eNB. To this end, it should be discussed which resource a remote UE uses to transmit HARQ ACK to a relay UE after receiving a DL signal and when and which resource the relay UE uses to forward the HARQ ACK to an eNB.

When the remote UE receives the DL signal in subframe n, the remote UE may signal to the relay UE whether DL decoding is successful in sidelink subframe n+k1. Then, the relay UE may forward the HARQ ACK of the remote UE in UL subframe n+k2.

In this case, the value or range of k1 and/or k2 may be predetermined or indicated by the eNB through physical layer signaling or higher layer signaling. For example, it may be regulated that k1 is more than n1 and less than n2 and k2 is a multiple of 8. In addition, k2 may be directly signaled to a UE in DCI, and in this case, the UE may autonomously select the value of k1 from values more than y and less than k2−x (the values of x and y may be predetermined or signaled by the eNB).

In an embodiment, a method of configuring a resource for HARQ ACK of a remote UE is proposed. Specifically, the eNB may signal a PUCCH resource for transmitting the HARQ ACK of the remote UE through RRC. When the relay UE signals the HARQ ACK of the remote UE, the relay UE may transmit the HARQ ACK on a resource predetermined by the RRC. According to this method, when the relay UE forwards HARQ ACK of another UE, the relay UE may use a predetermined resource, and thus, the relay UE may stably transmit the ACK with no collision.

According to an embodiment, since a PUCCH resource corresponding to a PDSCH of the remote UE is not used when the PDSCH is scheduled, the relay UE may transmit the HARQ ACK on the PUCCH resource corresponding to the PDSCH of the remote UE. For example, assuming that information on HARQ ACK timing (k) is included in DCI of the remote UE and the relay UE is capable of obtaining the value of k and the index of a control channel element (CCE) in a certain manner (for example, the remote UE may inform the value of k and the CCE index, the relay UE may obtain the value of k and the CCE index by decoding the DCI of the remote UE, or the eNB may signal the value of k and the CCE index), the relay UE may transmit ACK on a PUCCH resource corresponding to the CCE index of the remote UE in subframe (n+k).

The relay UE may determine the timing of a subframe (SF) in which HARQ ACK transmission is to be performed based on information indicated by the eNB (information on the SF for transmitting the HARQ ACK for the PDSCH of the remote UE). Alternatively, the relay UE may be provided with the SF timing from the remote UE. Further, the relay UE may determine the SF timing based on the upper limit of predetermined HARQ ACK transmission SFs, and more particularly, by performing selection within the upper limit. In the case of the unidirectional relay, the relay UE may transmit HARQ ACK on a HARQ ACK resource of the remote UE by considering that the HARQ ACK resource of the remote UE is not used. Thus, eNB implementation may be simplified. That is, the eNB may maintain conventional DL HARQ operation without distinguishing which UE transmits the HARQ ACK.

Alternatively, the eNB may transmit a PDSCH to the remote UE and, at the same time, directly indicate a PUCCH resource to be used by the relay UE for HARQ ACK transmission. After the eNB informs the relay UE of the PUCCH resource for the HARQ ACK transmission, the remote UE may transmit HARQ ACK to the relay UE. This method may be efficiently applied to a heterogeneous network (HetNet) situation (for example, a situation in which DL and UL coverage is asymmetric, that is, a UL signal is transmitted to a near relay cell but a DL signal is received from a far macro cell). That is, the method may be applied when a DL signal is received from a macro cell and HARQ ACK is transmitted to a small cell. In this case, a macro eNB or a small cell eNB may directly indicate which resource is used as a HARQ ACK resource for a small cell. Further, such HARQ ACK resource information may be provided through backhaul between the macro eNB and small cell eNB. According to this method, the remote UE may significantly reduce UL TX power.

The present disclosure is not limited to direct communication between UEs. That is, the disclosure may be applied to UL or DL communication, and in this case, the proposed methods may be used by an eNB, a relay node, etc. Since each of the examples of the proposed methods may be included as one method for implementing the present disclosure, it is apparent that each example can be regarded as a proposed method. In addition, although the proposed methods may be implemented independently, some of the proposed methods may be combined (or merged) for implementation. Moreover, it may be regulated that information on whether the proposed methods are applied (or information on rules related to the proposed methods) should be transmitted from the eNB to the UE through a predefined signal (e.g., a physical layer signal, a higher layer signal, etc.).

FIG. 14 is a flowchart for explaining a method by which a relay UE controls sidelink signal power.

Referring to FIG. 14, a relay UE may receive a sidelink signal including first measurement information from a remote UE that exchanges sidelink signals. The first measurement information may correspond to information on received power measured for the sidelink signal. The received power information may include measurement information on the received power of the sidelink signal, and the measurement information may correspond to the received power of the sidelink signal measured based on at least one of the following measurement methods: SD-RSRP, PSSCH RSRP, S-RSSI, PSCCH RSRP, and PSCCH RSSI (S301).

The relay UE may also measure the received power of the sidelink signal transmitted from the relay UE. Information on the received power measured by the relay UE may be referred to as second measurement information. The relay UE may report to an eNB at least one of the obtained second measurement information or the first measurement information received from the remote UE (S303).

The remote UE transmits the first measurement information to the eNB through a sidelink to the relay UE instead of directly transmitting the first measurement information to the eNB using a UL signal. Specifically, by transmitting the first measurement information to the eNB through the relay UE, the remote UE may significantly reduce transmission power compared to when directly transmitting the first measurement information to the eNB using the UL signal. In this case, the relay UE may select one of the first measurement information and the second measurement information that the relay UE obtains by measuring the received power for the sidelink and then transmit the selected information to the eNB. Then, the relay UE may autonomously determine a sidelink power value for the remote UE by receiving information on sidelink power control from the eNB.

The relay UE may select and determine measurement information to report to the eNB by comparing the first and second measurement information. When each of the first and second measurement information includes multiple measurement values based on various measurement methods, the relay UE may compare the first and second measurement information by matching the measurement values respectively. For example, if the each of the first and second measurement information includes measurement values based on the SD-RSRP, PSSCH RSRP, and S-RSSI, the relay UE may compare the SD-RSRP in the first measurement information and the SD-RSRP in the second measurement information, compare the PSSCH RSRP in the first measurement information and the PSSCH RSRP in the second measurement information, and compare the S-RSSI in the first measurement information and the S-RSSI in the second measurement information. Although the relay UE reports the second measurement information to the eNB, the relay UE may determine a measurement value to report to the eNB among the SD-RSRP, PSSCH RSRP, and S-RSSI measurement values included in the first measurement information based on comparison results.

If a difference between measurement values included in the first and second measurement information is more than or equal to a predetermined threshold, the relay UE may report to the eNB both the first and second measurement information. On the contrary, if the difference between the measurement values included in the first and second measurement information is less than the predetermined threshold, the relay UE may select one of the first and second measurement information and then report only the selected information to the eNB. When each of the first and second measurement information includes multiple measurement values based on various measurement methods, the relay UE may compare the first and second measurement information by matching the measurement values respectively. For example, if a difference between the SD-RSRP measurement values included in the first and second measurement information is more than or equal to a predetermined threshold, the relay UE may report both the SD-RSRP measurement values included in the first and second measurement information to the eNB. If a difference between the PSSCH RSRP measurement values included in the first and second measurement information is less than a predetermined threshold, the relay UE may select one of the first and second measurement information including the PSSCH RSRP measurement values and then report only the selected information to the eNB. Similarly, if a difference between the S-RSSI measurement values included in the first and second measurement information is less than a predetermined threshold, the relay UE may select one of the first and second measurement information including the S-RSSI measurement values and then report only the selected information to the eNB. In this case, among the SD-RSRP, PSSCH RSRP and S-RSSI, only both the SD-RSRP measurement values included in the first and second measurement information may be reported to the eNB.

Next, the relay UE may receive power control information from the eNB. The power control information may include information on a transmission power range or a transmission power parameter, which are determined by the eNB based on at least one of the first or second measurement information reported by the relay UE. The relay UE may determine a sidelink transmission power value based on the received power control information. In particular, when the power control information includes the information on the transmission power range, the relay UE may determine the sidelink transmission power value for the remote UE by considering the characteristics of the sidelink to the remote UE. Specifically, when the power control information includes the information on the transmission power range, the relay UE may autonomously determine the transmission power value for the remote UE in the power transmission range included in the power control information based on a latency requirement, a PPPP, and a transmission parameter of the remote UE (S305).

Meanwhile, the remote UE may transmit a UL signal to the eNB only through the relay UE to minimize the transmission power of the UL signal and reduce complexity. Specifically, the remote UE may transmit to the relay UE ACK/NACK information for a DL signal received from the eNB in a sidelink signal. Upon receiving the sidelink signal including the ACK/NACK information from the remote UE, the relay UE may forward the signal including the ACK/NACK information to the eNB. In this case, the remote UE may transmit the sidelink signal including the ACK/NACK information based on the transmission power value determined by the relay UE.

The relay UE may autonomously determine a relay resource for forwarding the UL signal corresponding to the ACK/NACK information to the eNB. In this case, since the remote UE does not use a resource scheduled for the UL signal related to the received DL signal, the relay UE may determine the scheduled resource as the relay resource and then forward the signal including the ACK/NACK information to the eNB. To this end, the relay UE may need to obtain scheduling information on the UL signal including the ACK/NACK information to be transmitted in response to the DL signal in advance. Specifically, the relay UE may need to obtain information on the SF timing or CCE of the UL signal. This information may be obtained from DCI for the remote UE. The relay UE may obtain the DCI from the remote UE or directly receive the DCI from the eNB. In particular, the relay UE may directly receive the DCI for the remote UE and then decode the received DCI to obtain the information on the SF timing or CCE. The relay UE may determine the relay resource based on the obtained SF timing or CCE information and forward the ACK/NACK information of the remote UE to the eNB using the determined relay resource.

FIG. 15 is a diagram schematically illustrating a UE performing D2D communication.

With continued reference to FIG. 15, a UE 20 according to the present disclosure may include a receiver 21, a transmitter 22, a processor 23, a memory 24, and a plurality of antennas 15. Use of the plurality of antennas 25 means that the UE 20 supports MIMO transmission and reception. The receiver 21 may receive various DL signals, data, and information from an eNB or receive a D2D signal (sidelink signal) from another UE. The transmitter 22 may transmit various UL signals, data, and information to the eNB or transmit a D2D signal (sidelink signal) to the other UE. The processor 23 may control overall operations of the UE 20.

The processor 23 of the UE 20 according to an embodiment of the present disclosure may perform the operations required for the above-described embodiments.

In addition, the processor 23 of the UE 20 may perform functions of processing information received by the UE 20 or information to be transmitted to the outside. The memory 24 may be configured to store the processed information during a prescribed time period, and it may be replaced with a component such as a buffer (not shown in the drawing).

The UE and a transmission point device may be implemented such that the above-described embodiments of the present disclosure are independently implemented or two or more embodiments are simultaneously implemented. Here, redundant descriptions are omitted for clarity.

The details of the transmission point device in FIG. 15 may be equally applied to a relay device operating as a downlink transmission entity, an uplink reception entity, or sidelink transmission entity, and the details of the UE 20 in FIG. 15 may be equally applied to a relay device operating as a downlink reception entity or an uplink transmission entity.

The embodiments of the present disclosure may be implemented through various means, for example, in hardware, firmware, software, or a combination thereof.

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means.

As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The above-described embodiments of the present disclosure are applicable to various mobile communication systems.

The invention claimed is:

1. A method of controlling power of a sidelink signal by a relay user equipment (UE) in a wireless communication system, the method comprising:
    receiving first measurement information corresponding to measurement information obtained by measuring received power of the sidelink signal from a remote UE transmitting and receiving the sidelink signal;
    comparing the first measurement information with second measurement information corresponding to information regarding the received power of the sidelink signal measured by the relay UE, and determining measurement information to report to a base station among the first and second measurement information; and
    receiving power control information from the base station, wherein the power control information is configured based on the determined measurement information, and determining a power value for controlling sidelink power of the remote UE based on the received power control information,
    wherein based on a difference between a measurement value included in the first measurement information and a measurement value included in the second measurement information being greater than or equal to a predetermined threshold, the relay UE reports both the first and second measurement information to the base station.

2. The method of claim 1, wherein the power control information includes information regarding at least one of a range of transmission power of the sidelink signal or a configuration parameter for the transmission power.

3. The method of claim 2, wherein based on the power control information including the information regarding the range of the transmission power of the sidelink signal, the determined power value is determined within the range of the transmission power of the sidelink signal based on a latency requirement, a proximity service (ProSe) priority per packet (PPPP), and a transmission parameter.

4. The method of claim 1, wherein each of the first and second measurement information includes a measurement value based on at least one of: sidelink discovery reference signal received power (SD-RSRP), physical sidelink shared channel reference signal received power (PSSCH RSRP), a sidelink-received signal strength indicator (S-RSSI), physical sidelink control channel reference signal received power (PSCCH RSRP), and a physical sidelink control channel received signal strength indicator (PSCCH RSSI).

5. The method of claim 4, wherein the PSCCH RSSI corresponds to received power of a transport block measured in intervals except at least one of an interval used for automatic gain control (AGC) or an interval used for transmission/reception (Tx/Rx) switching.

6. The method of claim 4, wherein the PSCCH RSRP corresponds to an average value of received power of a reference signal (RS) for a resource indicated by a PSCCH or a resource related to a predetermined hopping pattern.

7. The method of claim 1, wherein each of the first and second measurement information includes information regarding the received power of the sidelink signal measured during a power holding period indicated by the base station, and wherein the power holding period corresponds to a period in which the relay UE or the remote UE transmits the sidelink signal without changing transmission power.

8. The method of claim 7, wherein the power holding period is configured with at least one of the following units: a sidelink control (SC) period and a period for transmitting a medium access control protocol data unit (MAC PDU).

9. The method of claim 1, further comprising receiving the sidelink signal transmitted by the remote UE with transmission power based on the determined power value, wherein the sidelink signal includes acknowledgement/negative-acknowledgement (ACK/NACK) for a downlink signal received from the base station.

10. The method of claim 9, further comprising:
determining a relay resource for transmitting the ACK/NACK by considering information regarding a resource scheduled to the remote UE for the downlink signal, and
transmitting the ACK/NACK to the base station on the determined relay resource, instead of the remote UE.

11. The method of claim 1, wherein the remote UE skips transmitting an uplink signal to the base station.

12. A relay user equipment (UE) configured to control power of a sidelink signal in a wireless communication system, the relay UE comprising:
a transceiver; and
a processor configured to control the relay UE to perform operations comprising:

receiving, via the transceiver, first measurement information corresponding to measurement information obtained by measuring received power of the sidelink signal from a remote UE transmitting and receiving the sidelink signal, comparing the first measurement information with second measurement information corresponding to information regarding the received power of the sidelink signal measured by the relay UE, and determining measurement information to report to a base station among the first and second measurement information, receiving, via the transceiver, power control information from the base station, wherein the power control information is configured based on the determined measurement information, and determining a power value for controlling sidelink power of the remote UE based on the received power control information, wherein the operations further comprise: based on a difference between a measurement value included in the first measurement information and a measurement value included in the second measurement information being greater than or equal to a predetermined threshold, reporting, by the relay UE, both the first and second measurement information to the base station.

13. The UE of claim 12, wherein the operations further comprise:
receiving a user input to switch the drive mode from an autonomous mode to a manual mode, or to switch from a manual mode to an autonomous mode.

* * * * *